United States Patent
Nakano et al.

(10) Patent No.: US 8,218,952 B2
(45) Date of Patent: Jul. 10, 2012

(54) CONTENT PLAYBACK DEVICE AND CONTENT PLAYBACK METHOD

(75) Inventors: Shinichiro Nakano, Kokubunji (JP); Yasuhiro Fujiyoshi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 291 days.

(21) Appl. No.: 12/567,191

(22) Filed: Sep. 25, 2009

(65) Prior Publication Data

US 2010/0111492 A1     May 6, 2010

(30) Foreign Application Priority Data

Oct. 31, 2008  (JP) ................. 2008-282358

(51) Int. Cl.
- *H04N 5/783* (2006.01)
- *H04N 5/93* (2006.01)
- *H04N 5/80* (2006.01)

(52) U.S. Cl. ........ 386/350; 386/349; 386/351; 386/352; 386/248; 386/353

(58) Field of Classification Search ............... 386/326, 386/343, 248, 350–352, 349, 353
See application file for complete search history.

(56) References Cited

U.S. PATENT DOCUMENTS

| | | | | |
|---|---|---|---|---|
| 5,307,173 | A * | 4/1994 | Yuen et al. | 386/234 |
| 5,515,173 | A * | 5/1996 | Mankovitz et al. | 386/296 |
| 7,188,356 | B1 | 3/2007 | Miura et al. | |
| 7,369,749 | B2 * | 5/2008 | Ichioka et al. | 386/291 |

FOREIGN PATENT DOCUMENTS

| | | |
|---|---|---|
| JP | 8-289279 | 11/1996 |
| JP | 11-205764 | 7/1999 |
| JP | 2001-145087 A | 5/2001 |
| JP | 2001-333358 | 11/2001 |
| JP | 2004-88315 A | 3/2004 |
| JP | 2004-236240 | 8/2004 |
| JP | 2008-178056 A | 7/2008 |

OTHER PUBLICATIONS

Japanese Office Action dated Nov. 17, 2009, Japanese Patent Application No. 2008-282358.
Japanese Office Action dated Mar. 9, 2010, Japanese Patent Application No. 2008-282358.

* cited by examiner

*Primary Examiner* — Helen Shibru
(74) *Attorney, Agent, or Firm* — Patterson & Sheridan, LLP (57) ABSTRACT

According to one embodiment, a content playback device includes a receiving module which receives a plurality of channels including content, a selection module which selects a desired channel from a plurality of channels, a playback module which plays back a content item included in the selected channel, and a creation module which creates a special clock based on a playback time of a content item for the selected channel.

8 Claims, 6 Drawing Sheets

CONTENT PLAYBACK DEVICE AND CONTENT PLAYBACK METHOD

CROSS-REFERENCE TO RELATED APPLICATIONS

This application is based upon and claims the benefit of priority from Japanese Patent Application No. 2008-282358, filed Oct. 31, 2008, the entire contents of which are incorporated herein by reference.

BACKGROUND

1. Field

One embodiment of the present invention relates to improvements in a content playback device and a content playback method, in which content such as video and audio is acquired from a content provider connected via a network, for example, and played back.

2. Description of the Related Art

As is well known, switchover to digital television broadcasting is underway. In Japan, for example, terrestrial digital broadcasting and digital direct broadcasting by satellite (digital DBS) have started.

Nowadays, Internet broadcasting, in which content such as video and audio is transmitted over the Internet, has been put into practical use. In particular, a video-on-demand (VOD) service has become pervasive. In VOD, a content provider individually provides a user with a desired content in response to a request from the user.

There is a trend to provide such a digital broadcast receiver for receiving digital television broadcasting with a function compliant with a VOD function, i.e., the function of accessing a content provider via a network to request a desired content and receiving and playing back the content transmitted by the content provider.

Such a VOD service is still developing, and will be improved in various forms to enhance convenience in handling for the user. In accordance with this trend, digital broadcast receivers compliant with a VOD function need to effectively support newly developed services.

Jpn. Pat. Appln. KOKAI Publication No. 8-289279 discloses a system of connecting a center and a subscriber via a line and causing the center to individually provide the subscriber with a requested program. In this system, the subscriber has a function of transmitting a pause signal indicating temporary interruption or cancellation of interruption of provided programs. During the period from the interruption to the cancellation of interruption indicated by the pause signal, the line connection is cut.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a content playback device includes a receiving module which receives a plurality of channels including content, a selection module which selects a desired channel from a plurality of channels, a playback module which plays back a content item included in the selected channel, and a creation module which creates a special clock based on a playback time of a content item for the selected channel.

Figure 1:
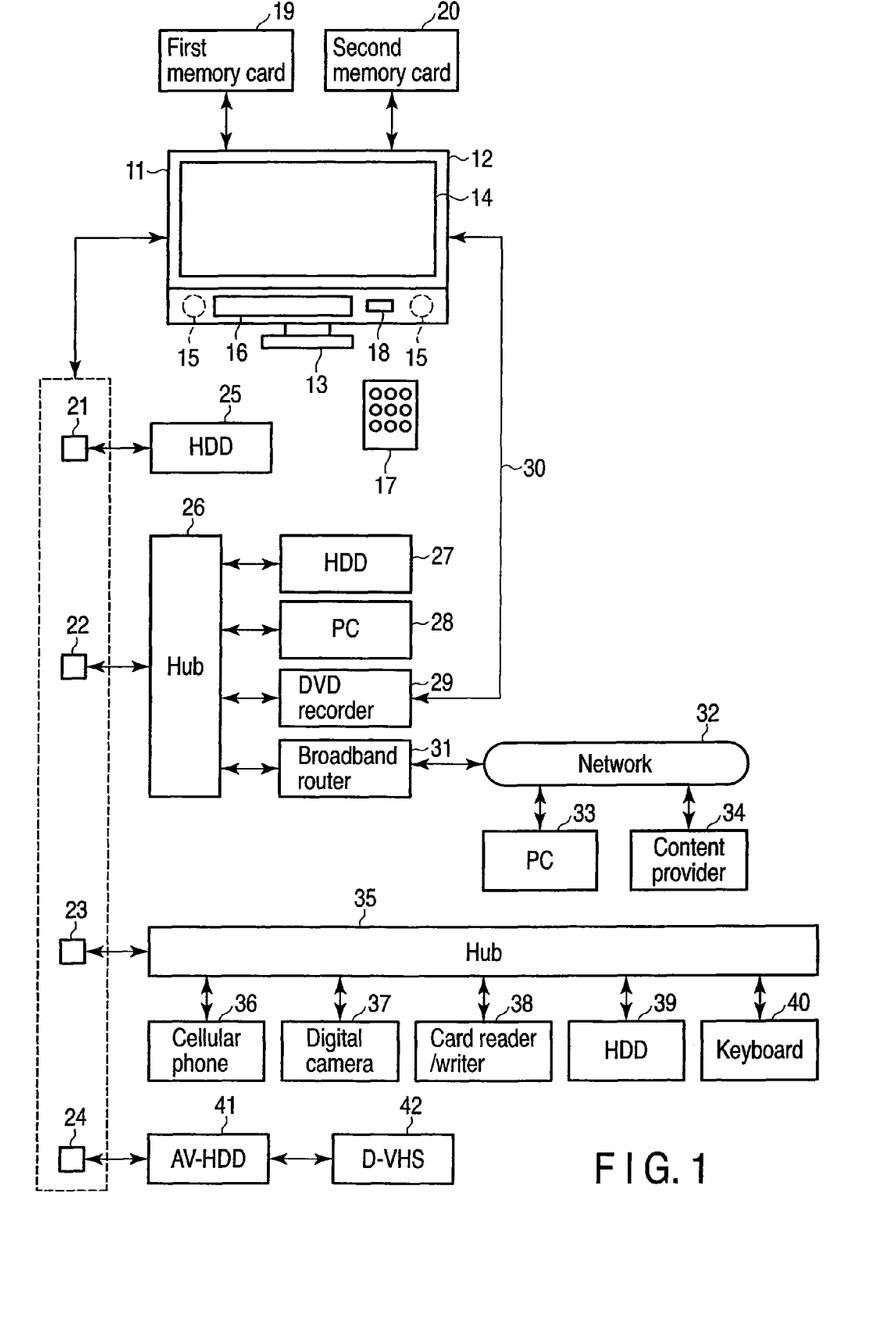
FIG. 1 illustrates an example of a digital television broadcast receiver and a network system in which the digital television broadcast receiver plays a central role, according to an embodiment of the present invention.

FIG. 1 schematically shows an example of an external view of a digital television broadcast receiver 11 and a network system in which the digital television broadcast receiver 11 plays a central role, according to the present embodiment.

More specifically, the digital television broadcast receiver 11 is mainly formed of a flat cabinet 12 and a support 13 which supports the cabinet 12 in a standing position. The cabinet 12 includes a video display device 14 which is a flat-panel display including a liquid crystal display panel, for example, a pair of speakers 15, an operating module 16, a light receiving module 18 which receives operational information transmitted from a remote controller 17, and so forth.

A first memory card 19, such as a Secure Digital (SD) memory card, a multimedia card (MMC), and a Memory Stick, can be attached and detached to and from the digital television broadcast receiver 11. Information about programs, pictures, and the like, is recorded and played back to and from the first memory card 19.

A second memory card (integrated circuit [IC] card) 20, in which contract information, for example, is stored, can be attached and detached to and from the digital television broadcast receiver 11. The contract information in the second memory card 20 is played back.

The digital television broadcast receiver 11 comprises a first local area network (LAN) socket 21, a second LAN socket 22, a Universal Serial Bus (USB) socket 23, and an Institute of Electrical and an Electronics Engineers (IEEE) 1394 socket 24.

The first LAN socket 21 is used as a LAN-compliant HDD-dedicated port, when information is recorded and played back based on Ethernet (trademark) to and from a LAN-compliant hard disk drive (HDD) 25, which is network attached storage (NAS) connected to the first LAN socket 21.

By thus providing the first LAN socket 21 as a LAN-compliant HDD-dedicated port, program information can be reliably recorded with a high-definition quality, without being affected by other network environments or network conditions.

The second LAN socket 22 is used as a general LAN-compliant port based on Ethernet (trademark). The second LAN socket 22 connects, via a hub 26, for example, devices such as a LAN-compliant HDD 27, a personal computer (PC)

28, and an HDD-equipped Digital Versatile Disk (DVD) recorder 29 having a function of receiving digital broadcasting, when information is transferred to/from these devices.

Since the digital information transferred via the second LAN socket 22 is restricted to information on a control system, the DVD recorder 29 requires a dedicated analog transfer path 30 for transferring analog video and audio information to/from the digital television broadcast receiver 11.

Since the second LAN socket 22 is connectable to a network 32 such as the Internet via a broadband router 31 connected to the hub 26, the second LAN socket 21 is used when information is transferred to/from a remote information provider such as the PC 33 and the content provider 34 over the network 32.

The USB socket 23 is used as a general USB-compliant port for connecting, via a hub 35, for example, USB devices such as a cellular phone 36, a digital camera 37, a card reader/writer 38 for reading/writing a memory card, an HDD 39, and a keyboard 40, when information is transferred to/from these USB devices.

The IEEE 1394 socket 24 is used to serially connect devices with a digital broadcast reception function such as an audiovisual-HDD (AV-HDD) unit 41 and a digital Video Home System (D-VHS) unit 42 compliant with IEEE 1394, when information is transferred to/from these devices.

Figure 2:
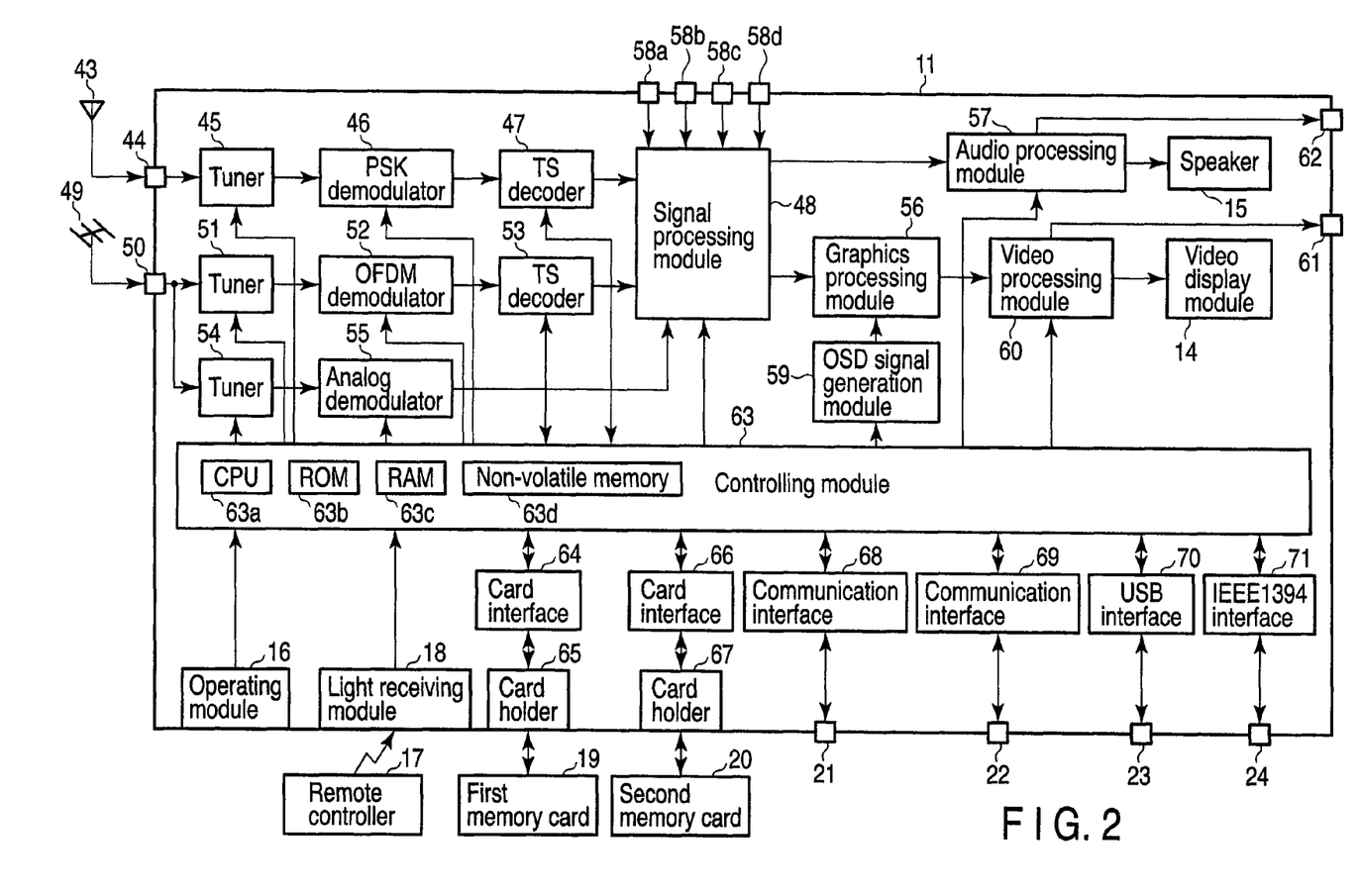
FIG. 2 is a block diagram illustrating a principal signal processing system of the digital television broadcast receiver, according to the embodiment.

FIG. 2 illustrates a principal signal processing system of the digital television broadcast receiver 11. When a digital DBS signal received by a DBS antenna 43 is supplied to a digital DBS tuner 45 via an input socket 44, the tuner 45 selects a broadcast signal of a desired channel.

The broadcast signal of the channel selected by the tuner 45 is supplied to a phase shift keying (PSK) demodulator 46, in which a transport stream (TS) is demodulated. The demodulated TS is supplied to a TS decoder 47, in which the demodulated TS is decoded to digital video and audio signals. The digital video and audio signals are then output to a signal processing module 48.

When a terrestrial digital television broadcast signal received by a terrestrial broadcasting receiving antenna 49 is supplied to a terrestrial digital broadcasting tuner 51 via an input socket 50, the terrestrial digital broadcasting tuner 51 selects a broadcast signal of a desired channel.

The broadcast signal of the channel selected by the tuner 51 is supplied to an orthogonal frequency division multiplexing (OFDM) demodulator 52, in which a TS is demodulated. The demodulated TS is supplied to a TS decoder 53, in which the demodulated TS is decoded to digital video and audio signals. The digital video and audio signals are then output to the signal processing module 48.

When a terrestrial analog television broadcast signal received by the terrestrial broadcasting receiving antenna 49 is supplied to a terrestrial analog broadcasting tuner 54 via the input socket 50, the terrestrial analog broadcasting tuner 54 selects a broadcast signal of a desired channel. The broadcast signal of the channel selected by the tuner 54 is supplied to an analog demodulator 55, in which the broadcast signal is demodulated to analog video and audio signals. The analog video and audio signals are then output to the signal processing module 48.

The signal processing module 48 selectively performs predetermined digital signal processing with respect to the digital video and audio signals supplied from each of the TS decoders 47, 53, and outputs the processed signals to a graphic processing module 56 and an audio processing module 57.

A plurality of (4 in the case of FIG. 2) input sockets 58a, 58b, 58c, 58d are connected to the signal processing module 48. Each of the input sockets 58a-58d allows analog video signals and audio signals to be input from outside the digital television broadcast receiver 11.

The signal processing module 48 selectively digitizes the analog video and audio signals supplied from each of the analog demodulator 55 and the input sockets 58a-58d, performs predetermined digital signal processing with respect to the digitized video and audio signals, and then output the processed signals to the graphic processing module 56 and the audio processing module 57.

The graphic processing module 56 has a function of superimposing an on-screen display (OSD) signal generated by an OSD signal generation module 59 on a digital video signal supplied from the signal processing module 48, and outputting the superimposed signal. The graphic processing module 56 can selectively output the video signal output from the signal processing module 48 and the OSD signal output from the OSD signal generation module 59, and output both of the output signals by combining the signals such that each of the signals forms half the screen.

The digital video signal output from the graphic processing module 56 is supplied to a video processing module 60. The video processing module 60 coverts the input digital video signal into an analog video signal in a format which can be displayed on the video display device 14, and outputs the converted signal to the video display device 14 to cause the video display device 14 display video. Further, the video processing module 60 lets the digital video signal output to the outside via the output socket 61.

The audio processing module 57 coverts the input digital audio signal into an analog audio signal in a format which can be played back by the speaker 15, and outputs the converted signal to the speaker 15 to cause the speaker 15 to play back audio. Further, the audio processing module 57 lets the digital audio signal output to the outside via the output socket 62.

All the operations of the digital television broadcast receiver 11, including the above-described reception operations of various kinds, are collectively controlled by a controlling module 63. The controlling module 63 is equipped with a central processing unit (CPU) 63a. Upon receipt of operational information from the operating module 16 or upon receipt of operational information transmitted by the remote controller 17 and received by the light receiving module 18, the controlling module 63 controls each module such that the operational information is reflected.

In this case, the controlling module 63 mainly uses a read only memory (ROM) 63b in which control programs executed by the CPU 63a are stored, a random access memory (RAM) 63c which provides the CPU 63a with a work area, and a non-volatile memory 63d in which information of various kinds including setting information and control information is stored.

The controlling module 63 is connected to a card holder 65, to which the first memory card 19 can be attached, via a card interface (I/F) 64. Thereby, the controlling module 63 can transfer information to/from the first memory card 19 attached to the card holder 65 via the card interface 64.

The controlling module 63 is further connected to a card holder 67, to which the second memory card 20 can be attached, via a card interface 66. Thereby, the controlling module 63 can transfer information to/from the second memory card 20 attached to the card holder 67 via the card interface 66.

The controlling module 63 is further connected to a first LAN socket 21 via a communication interface 68. Thereby, the controlling module 63 can transfer information to/from the LAN-compliant HDD 25 connected to the first LAN socket 21 via the communication interface 68. In this case, the controlling module 63 has a dynamic host configuration protocol (DHCP) server function, and performs control by assigning an Internet Protocol (IP) address to the LAN-compliant HDD 25 connected to the first LAN socket 21.

The controlling module 63 is further connected to the second LAN socket 22 via a communication interface 69. Thereby, the controlling module 63 can transfer information to/from each of the devices (see FIG. 1) connected to the second LAN socket 22 via the communication interface 69. In this case, the controlling module 63 accesses the content provider 34 via the network 32 according to an operation by the user and requests the content provider 34 to acquire a desired content. Upon receipt of a content item transmitted from the content provider 34, the controlling module 63 causes the video display module 14 to display the video and causes the speaker 15 to playback the audio, or causes record playback devices such as the HDD 25, 27, 39 to record the content.

The controlling module 63 is further connected to the USB socket 23 via a USB interface 70. Thereby, the controlling module 63 can transfer information to/from the devices (see FIG. 1) connected to the USB socket 23 via the USB interface 70.

The controlling module 63 is further connected to the IEEE 1394 socket 24 via an IEEE 1394 interface 71. Thereby, the controlling module 63 can transfer information to/from the devices (see FIG. 1) connected to the IEEE 1394 socket 24 via the IEEE 1394 interface 71.

Figure 3:
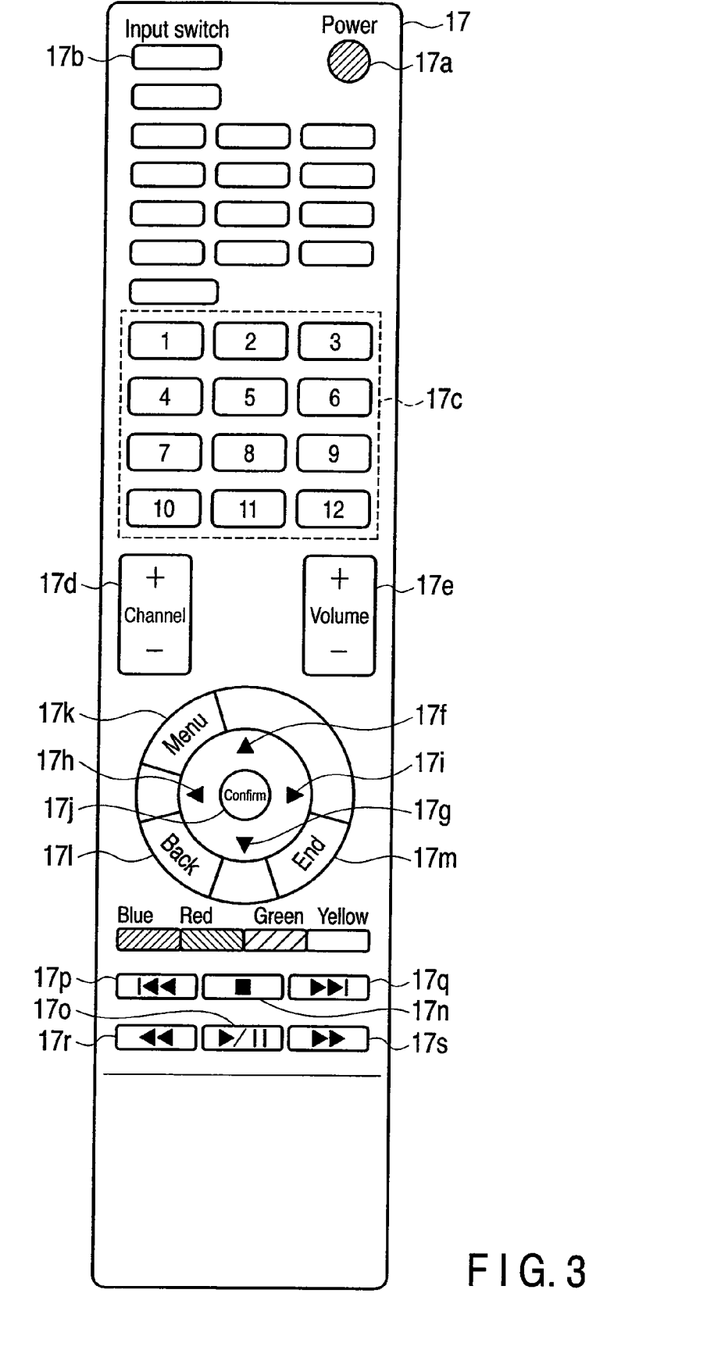
FIG. 3 is an external view illustrating a remote controller of the digital television broadcast receiver, according to the embodiment.

FIG. 3 is an external view of the remote controller 17. The remote controller 17 is mainly provided with a power key 17a, an input switching key 17b, a channel selection key 17c, a channel up/down key 17d, a sound volume adjusting key 17e, a cursor-up key 17f, a cursor-down key 17g, a cursor-left key 17h, a cursor-right key 17i, a confirmation key 17j, a menu key 17k, a back key 17l, an end key 17m, and so forth.

The remote controller 17 is further provided with a playback stop key 17n, a playback/pause key 17o, a reverse skip key 17p, a forward skip key 17q, a fast-rewind key 17r, a fast-forward key 17s, and so forth. That is, the content acquired from the content provider 34 by a VOD service can be played back, stopped, or paused by operating the playback stop key 17n or the playback/pause key 17o of the remote controller 17.

By operating the reverse skip key 17p or the forward skip key 17q of the remote controller 17, the reverse skip or the forward skip, in which the content being played back can be skipped by a certain amount in a reverse or forward direction with respect to the direction in which the content is played back, can be performed. By operating the fast-rewind key 17r or the fast-forward key 17s, fast-rewind playback or fast-forward playback, in which the content being played back is continuously played back at a high speed in a reverse or forward direction with respect to the direction in which the content is played back, can be performed.

The principal operations of the digital television broadcast receiver 11 with the above-described configuration will be described in detail below. In this case, the content provider 34 offers a service similar to broadcasting, i.e., the service of categorizing the content prepared for the VOD service into different kinds such as genres and titles, arranging the categorized content on the time axis, and selectively distributing a plurality of channels categorized by kind.

By providing the above-described service, the content provider 34 can create and distribute a channel such as a movie channel or a sport channel, in which only content prepared for a VOD service is used. Thereby, the user can acquire and view a content item matching the user's taste from the content provider 34 through a simple operation of selecting a desired channel. In this case, the user is released from a complicated process of retrieving desired content from enormous amounts of content provided by the content provider 34.

The content distributed by the selected channel is content prepared by the content provider 34 for distribution based on a VOD service, for example, instead of normal content broadcast over the air, i.e., scheduled programs from broadcasting stations.

By operating the remote controller 17, the user can perform special operations such as stop, pause, reverse skip, forward skip, fast-rewind playback, and fast-forward playback, with respect to the content being played back in the selected channel. It is thereby possible to play back the content allocated to a past time zone or a future time zone, for example.

Figure 4:
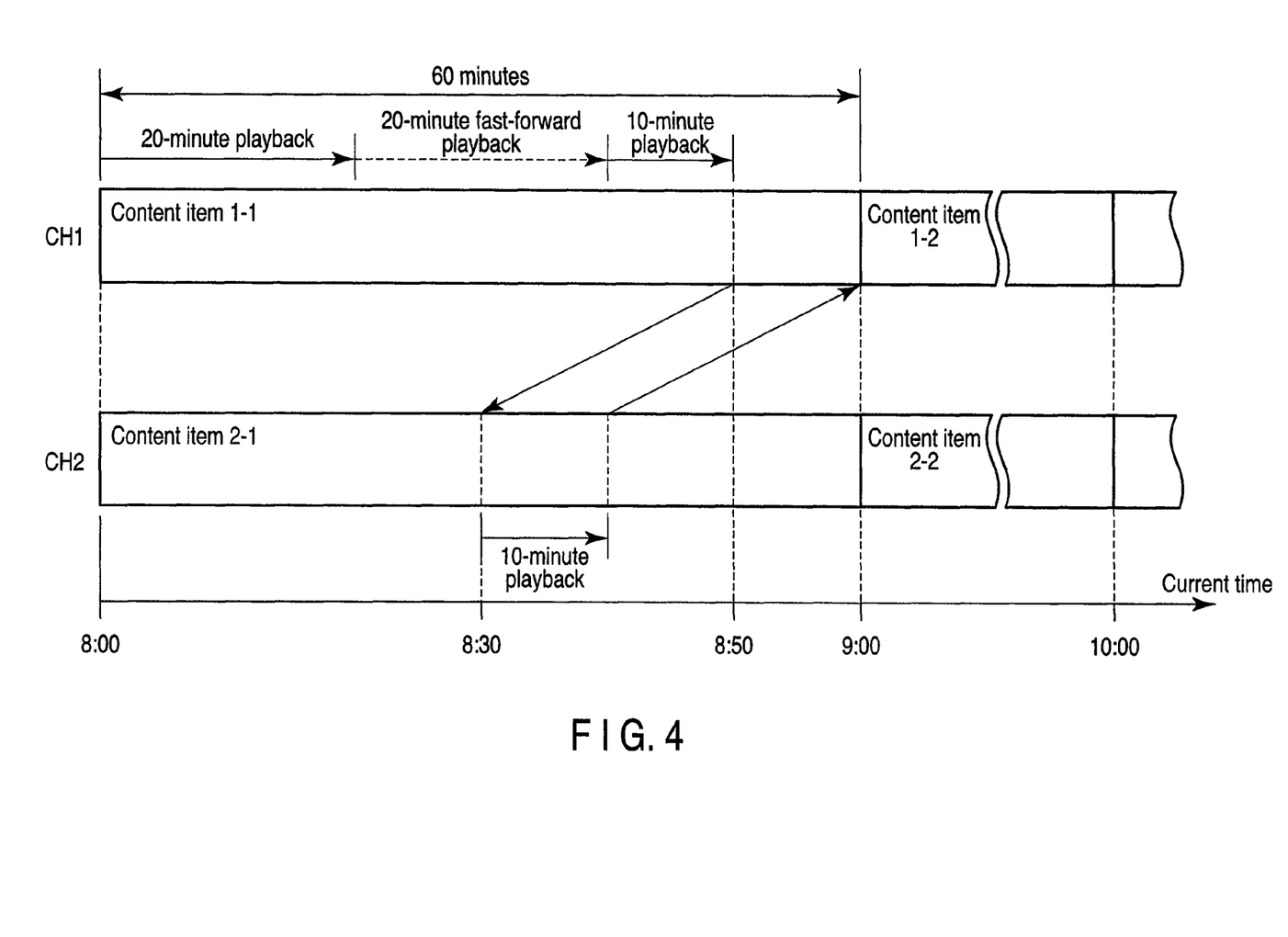
FIG. 4 illustrates principal operations performed in the digital television broadcast receiver according to the embodiment.

FIG. 4 shows two channels CH1 and CH2 prepared using only the content prepared for a VOD service by the content provider 34. In this case, in channel CH1, a content item 1-1 is scheduled to be distributed from AM 8:00 to 9:00, and a content item 1-2 is scheduled to be distributed from AM 9:00 to 10:00. In channel CH2, a content item 2-1 is scheduled to be distributed from AM 8:00 to 9:00, and a content item 2-2 is scheduled to be distributed from AM 9:00 to 10:00.

Assume that the user selects channel CH1 from AM 8:00, plays back the content 1-1 for twenty minutes, fast-forwards the content 1-1 by an amount corresponding to twenty minutes, plays back the content 1-1 for ten minutes, and then switches to channel CH2. Assuming that the time required for fast-forwarding the content 1-1 by an amount corresponding to twenty minutes is 0 for simplicity, the content 1-1 is played back for thirty minutes in total. In this case, the current time at the time of switching from channel CH1 to channel CH2 is AM 8:30, when thirty minutes have elapsed from AM 8:00.

Since the content 1-1 is played back for twenty minutes, fast-forwarded by an amount corresponding to twenty minutes, and then played back for ten minutes, the playback position of the content 1-1 at the time of switching from channel CH1 to channel CH2 is the position of AM 8:50, when 50 minutes have elapsed from AM 8:00. That is, when a special operation (fast-forward playback in this case) is performed with respect to the content 1-1 distributed in channel CH1, a time lag occurs between the time reached in channel CH1 and the current time.

Accordingly, the controlling module 63 of the digital television broadcast receiver 11 creates a CH1 special clock when channel CH1 is selected. The CH1 special clock is created after a CH1 timer, not shown, starts to increment time. When a special operation such as fast-forward playback is performed in channel CH1, the CH1 special clock is corrected in consideration of the shift of the playback position due to the special operation.

Regarding channel CH2, the controlling module 63 creates a CH2 special clock when channel CH2 is selected, as in the case of channel CH1. Creation of the CH2 special clock is performed after a CH2 timer, not shown, starts to increment time. When a special operation such as fast-forward playback is performed in channel CH2, the CH2 special clock is corrected in consideration of the shift of the playback position due to the special operation.

In the example shown in FIG. 4, the controlling module 63 starts incrementing the CH2 special clock when switching is made from channel CH1 to channel CH2. In this case, the position at the time of switching from channel CH1 to channel CH2 is the position after 30 minutes have elapsed from the time (AM 8:00) when incrementing of the CH1 special clock has started. Therefore, the controlling module 63 starts playback of a content item (content item 2-1 in this case) in channel CH2 from a position after 30 minutes have elapsed from the time when incrementing of the CH1 special clock has started.

Assume that the user has switched to channel CH1 again after 10 minutes have elapsed from the start of playback of the content 2-1. Even when switching is made from channel CH1 to channel CH2, the controlling module 63 continues creating the CH1 special clock, i.e., incrementing the CH1 timer.

Accordingly, when the content 2-1 is played back for 10 minutes, the CH1 special clock is also AM 9:00, when 10 minutes have elapsed from the time (AM 8:50) of switching from channel CH1 to channel CH2. Thereby, when switching is made from channel CH2 to channel CH1, the controlling module 63 plays back the content 1-2, the playback start time of which is AM 9:00. Even when switching is made from channel CH2 to channel CH1, the controlling module 63 continues creating the CH2 special clock, i.e., incrementing the CH2 timer.

According to the above-described embodiment, a special clock is incremented in each of channels CH1 and CH2 based on the playback time of each content. Further, a special clock corrected in consideration of the shift of the playback time due to a special operation in one of channels CH1 and CH2, when switching is performed to the other one of channels CH2 and CH2, reflects the content playback start time in the other channel CH2 or CH1.

Therefore, as shown in FIG. 4, when playback of the content 1-1 reaches the end part (about AM 8:50), the user can view the content 2-1 of the other channel CH2 until playback of the content 1-1 is completely finished. After playback of the content 1-1 is completely finished, the user can switch to the original channel CH1. Thereby, the user can view the main part of the other content 2-1 without viewing a part (credits, for example) of the content 1-1.

Figure 5:
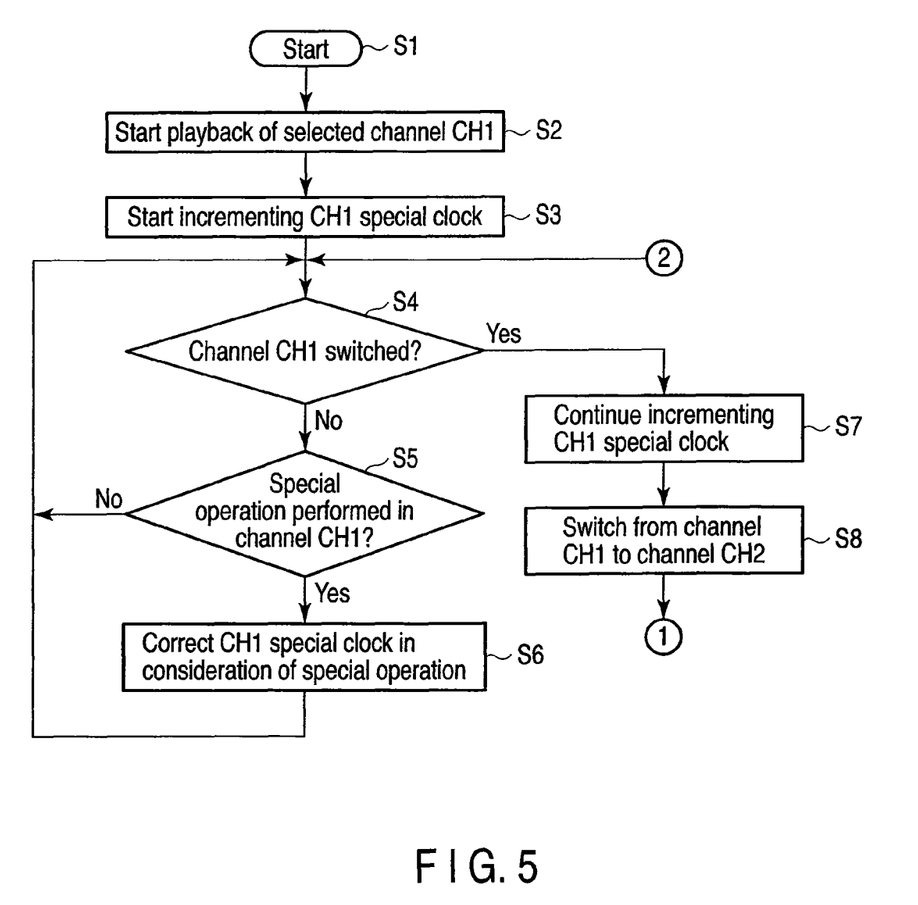
FIG. 5 is a flowchart illustrating a part of principal operations performed in the digital television broadcast receiver according to the embodiment.
Figure 6:
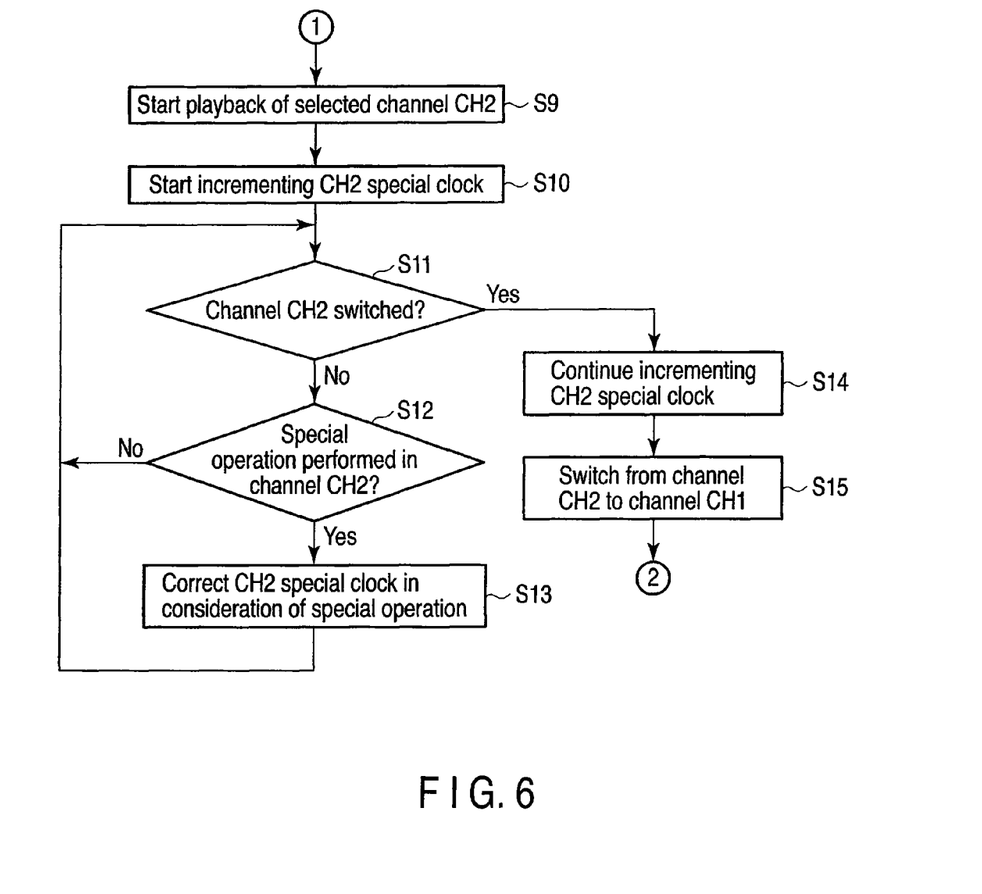
FIG. 6 is a flowchart illustrating the remaining part of the principal operations performed in the digital television broadcast receiver according to the embodiment.

FIGS. 5 and 6 illustrate flowcharts summarizing the principal operations executed by the controlling module 63 of the digital television broadcast receiver 11. When the processing is started (step S1), the controlling module 63 starts playback of selected channel CH1 in step S2, and starts incrementing a CH1 special clock of channel CH1 in step S3.

After that, the controlling module 63 judges in step S4 whether channel CH1 has been switched or not. Upon judgment that channel CH1 has not been switched (NO), the controlling module 63 judges whether a special operation has been performed in channel CH1 in step S5. Upon judgment that a special operation has not been performed (NO), the controlling module 63 returns to step S4. Upon judgment that a special operation has been performed in step S5 (YES), the controlling module 63 corrects a CH1 special clock in consideration of the shift of the playback position due to the special operation in step S6, and returns to step S4.

Upon judgment that channel CH1 has been switched in step S4 (YES), the controlling module 63 continues incrementing a CH1 special clock in step S7, switches from channel CH1 to channel CH2 in step S8, starts playback of channel CH2 in step S9, and starts incrementing a CH2 special clock in channel CH2 in step S10.

After that, the controlling module 63 judges in step S11 whether switching has been performed from channel CH2. Upon judgment that the switching has not been performed (NO), the controlling module 63 judges in step S12 whether a special operation has been performed in channel CH2. Upon judgment that a special operation has not been performed (NO), the controlling module 63 returns to step S11. Upon judgment in step S12 that a special operation has been performed (YES), the controlling module 63 corrects in step S13 a CH2 special clock in consideration of the shift in playback position due to the special operation, and then returns to step S11.

Upon judgment that switching has been performed from channel CH2 in step S11, the controlling module 63 continues incrementing the CH2 special clock in step S14, switches from channel CH2 to channel CH1 in step S15, and then shifts to step S4.

In the above-described embodiment, switching between two channels CH1 and CH2 has been described. Even if there are three or more channels, however, a sufficient effect can of course be obtained by the same operations as those described above by setting a special clock when each of the channels is selected for the first time.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content playback device comprising:
a receiving module configured to receive a plurality of channels including a plurality of contents arranged on a time axis;
a selection module configured to select a desired channel from the plurality of channels received by the receiving module;
a playback module configured to play back a content item included in the channel selected by the selection module; and
a creation module configured to create a special clock that is based on a playback time of the content item included in the channel selected by the selection module and corrected when the playback module executes a special operation and, when the selection module switches to another channel, establishes a playback start time of a content item included in said another channel based on the special clock.

2. The content playback device of claim 1, wherein the special operation includes one of stop, reverse skip, forward skip, fast-forward playback, and fast-rewind playback, and the creation module corrects the special clock according to the execution of the special operation.

3. A content playback device which receives a desired channel from a content distribution module, the content distribution module being configured to distribute a plurality of channels including a plurality of contents arranged on a time axis, said content playback device comprising:
a selection module configured to select a desired channel from a plurality of channels distributed by the content distribution module;
a playback module configured to perform playback of a content item of the channel selected by the selection module, the playback including a special operation;

a creation module configured to create a special clock for the channel selected by the selection module based on a playback time of the content in the channel that includes a time for the special operation, and to correct the special clock according to the special operation; and a controlling module which controls, when the selection module switches from one channel to another channel, a playback start position of a content item in said another channel based on the special clock.

4. The content playback device of claim 3, wherein the creation module continues, even when the selection module switches from a predetermined channel selected by the selection module to another channel during creation of a dedicated time for the predetermined channel selected by the selection module, creation of the dedicated time for the predetermined channel.

5. The content playback device of claim 3, wherein the creation module creates the special clock for the channel selected by the selection module by summing up the playback time of the content in the channel, the playback time including the time for the special operation.

6. The content playback device of claim 3, wherein the content distribution module includes a content provider connected via a network and configured to transmit a corresponding content upon receipt of an individual content acquisition request.

7. The content playback device of claim 3, wherein the playback module performs at least one of special operations of pause, reverse skip, forward skip, fast-forward playback, and fast-rewind playback, with respect to a content item being played back.

8. A content playback method of receiving a desired channel from a content distribution module and playing back a content item included in the received channel, the content distribution module being configured to distribute a plurality of channels including a plurality of contents arranged on a time axis, said content playback comprising method comprising:

selecting a desired channel from a plurality of channels distributed by the content distribution module;

performing playback of a content item in the selected channel, the playback including a special operation;

creating a special clock for the selected channel based on a playback time of the content item in the selected channel that includes a time for the special operation, and correcting the special clock according to the special operation; and controlling, when switching is performed from one channel to another channel, a playback start position of a content item in said another channel based on the special clock.

* * * * *